United States Patent [19]

Ohoba

[11] Patent Number: 5,038,384
[45] Date of Patent: Aug. 6, 1991

[54] INFORMATION READING APPARATUS

[75] Inventor: Mitsuru Ohoba, Ogaki, Japan

[73] Assignee: Nihon Taisanbin Kogyo Kabushiki Kaisha, Ogaki, Japan

[21] Appl. No.: 315,093

[22] Filed: Feb. 24, 1989

[30] Foreign Application Priority Data

Feb. 29, 1988 [JP] Japan .................................. 63-46858

[51] Int. Cl.$^5$ ............................................. G06K 9/00
[52] U.S. Cl. ........................................ 382/18; 382/46
[58] Field of Search ...................... 382/18, 46, 44, 30; 250/223 B

[56] References Cited

U.S. PATENT DOCUMENTS 4,450,579  5/1984  Nakashima et al. ................... 382/44
4,736,437  4/1988  Sacks et al. ........................... 382/44

Primary Examiner—Leo H. Boudreau
Attorney, Agent, or Firm—Armstrong, Nikaido, Marmelstein, Kubovcik & Murray

[57] ABSTRACT

An apparatus for reading information includes an original picture forming arrangement for converting a picture element signal of an object to a digital signal, and a word map forming arrangement for dividing the original image into rectangular sections that define a pattern contained in the original picture image for forming a word map, units of the word map being correlated with corresponding ones of the rectangular sections and coded to form a bit map. A first calculating arrangement is provided for distinguishing the pattern contained in the original picture image from the background, for determining an estimated inclination angle of the pattern contained in the original picture image. A second picture image forming arrangement rotates the pattern by an angle corresponding to the estimated inclination angle to form a second picture image, and a second calculating arrangement maps the second picture image in a horizontal direction and in a vertical direction to determine an inclination correcting angle required to substantially completely horizontally orient the pattern in the second picture image. A third picture image forming arrangement is provided for rotating the pattern contained in the second picture image by the inclination correcting angle to form a third picture image which has a corrected orientation of the pattern of the original picture image.

1 Claim, 6 Drawing Sheets

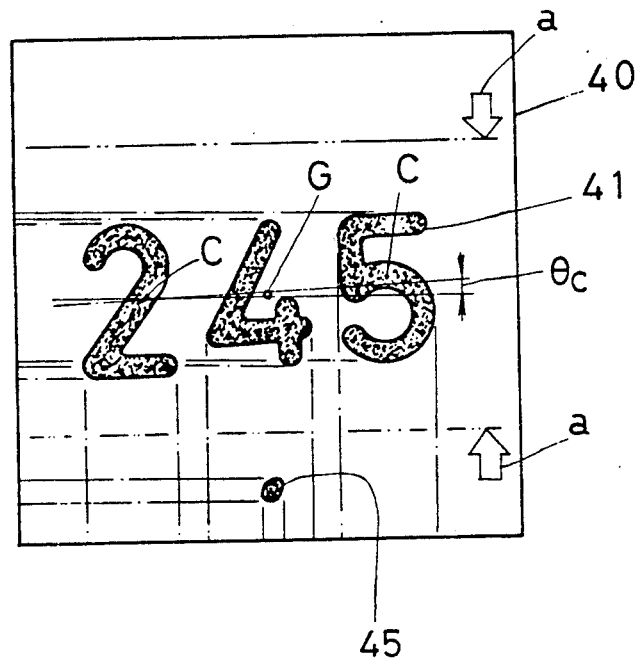
Fig. 12
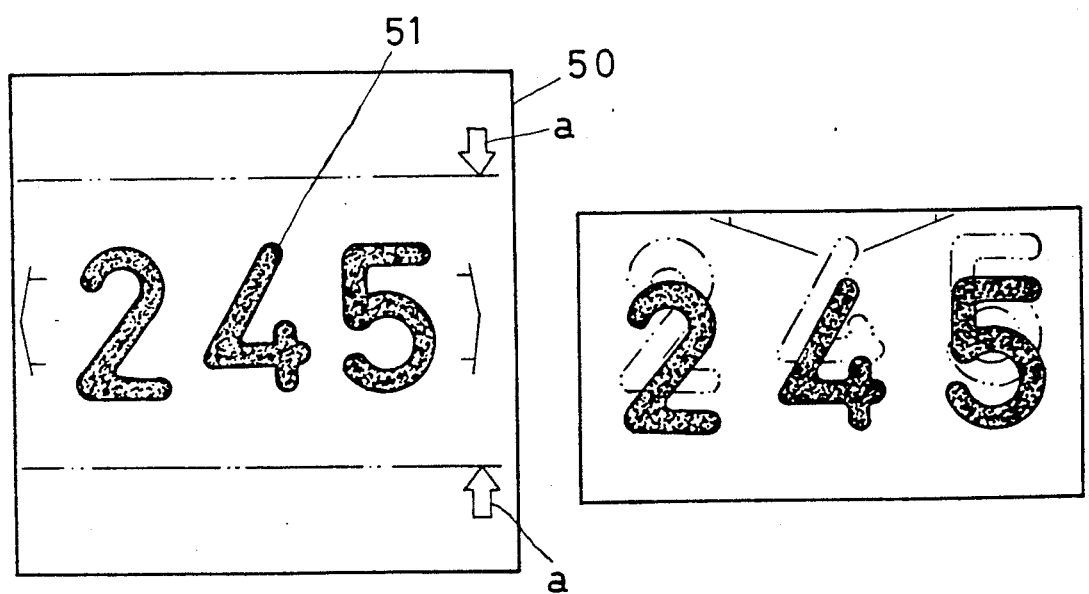
Fig. 13
Fig. 14

INFORMATION READING APPARATUS

BACKGROUND OF THE INVENTION

1. Field of the Invention

The present invention relates an apparatus for reading information and more precisely it relates to an apparatus for reading information on an object, such as a bottom of a bottle which can rotate to occupy any angular position.

2. Description of Related Art

Information, such as a company mark or a lot number or the like provided on a bottom of a bottle can not be read by a conventional reader for reading information on a post card, a paper or other document which has a constant or fixed direction, since the bottle can rotate to have any angular position. Namely, the angular direction of the bottle is not constant.

It is possible to form information of directionless codes or the like on a bottom of a bottle in order to realize an automatic reader. However, it is very difficult and inconvenient for an operator to read a specific symbol, such as a directionless code. Furthermore, special dies are needed to form such a directionless code.

SUMMARY OF THE INVENTION

The primary object of the present invention is therefore to provide an information reading apparatus in which even information which has no constant direction, consisting of numerals, Roman alphabet or other marks or the like can be read.

To achieve the object mentioned above, according to the present invention, there is provided an apparatus for reading information, comprising an original picture forming means for converting a picture element signal of an object taken by a TV camera to a digital signal to code the same into binary picture element signals in order to form a predetermined pattern of an original picture image from the binary picture element signals, a word map forming means for dividing the original picture image thus obtained into a plurality of rectangular sections to count the number of binary picture element signals that define the pattern of the original picture image distinguished from the pattern of the background for each rectangular section to obtain numerical data in order to form a word map in which the numerical data which are constituent units of the word map are correlated with the corresponding rectangular sections, a bit map forming means for coding the numerical data of the word map into binary numerical data which are correlated with the corresponding numerical data to form a bit map in which the binary numerical data are constituent units, a first calculating means for detecting a center of gravity and inclination angle of said pattern of the original picture image distinguished from the background in accordance with the numerical data corresponding to the parts of the binary numerical data of the word map that have a level higher than a predetermined binary numerical level and the coordinate of the rectangular sections of the original picture image corresponding to the numerical data having a higher level, a second picture image forming means for rotating said pattern of the original picture image by an angle corresponding to the inclination angle about the center of gravity to form a second picture image which has a pattern of a picture image located in a horizontal position, a second calculating means for mapping the second picture image in the horizontal and vertical directions to detect the inclination correcting angle of the pattern of the second picture image, a third picture image forming means for rotating the pattern of the second picture image by an angle corresponding to the inclination correcting angle to form a third picture image which has a corrected pattern of picture image, and a reading means for matching the corrected pattern of the third picture image with an erect master pattern and an inverted master pattern.

With this arrangement, the original picture image is formed by an image of a subject by the TV camera. The original picture image is processed to form the word map. The bit map is then formed by the word map. After that, to make it possible to correct the posture of the pattern of the original picture image into a horizontal position, the center of gravity and the inclination angle of the original picture image are calculated by the first calculating means and then the pattern is rotated about the center of gravity by an angle corresponding to the inclination angle by the second picture image forming means to form a second picture image in which the pattern is horizontally located. It should be appreciated that the calculation data used in the first calculating means are based on the numerical data of the word map selected by the bit map and the coordinate of the rectangular sections of the original picture image. Namely, the calculation is not performed in accordance with the output of the binary picture element signals of the original picture image and the data of the coordinate thereof, and accordingly, the process can be performed at a very high speed.

In the second calculating means, the horizontal pattern is mapped in the vertical and horizontal directions to detect the inclination correcting angle of the pattern of the necessary information. In the third picture image forming means, the pattern is rotated by an angle corresponding to the inclination correcting angle to form the third picture image in which the horizontal position of the pattern is corrected.

In the reading means, the pattern thus obtained is processed to match the erect master pattern and the inverted master pattern, so that both the erect and inverted horizontal patterns of the picture image can be matched.

BRIEF DESCRIPTION OF THE DRAWINGS

The invention will be described below in detail with reference to the accompanying drawings, in which:

FIGS. 2 and 3 are flow charts of the operations of an apparatus shown in FIG. 1; and, FIGS. 4 to 14 are schematic views showing image processing steps according to the present invention, particularly of which

DETAILED DESCRIPTION OF PREFERRED EMBODIMENT

Figure 1:
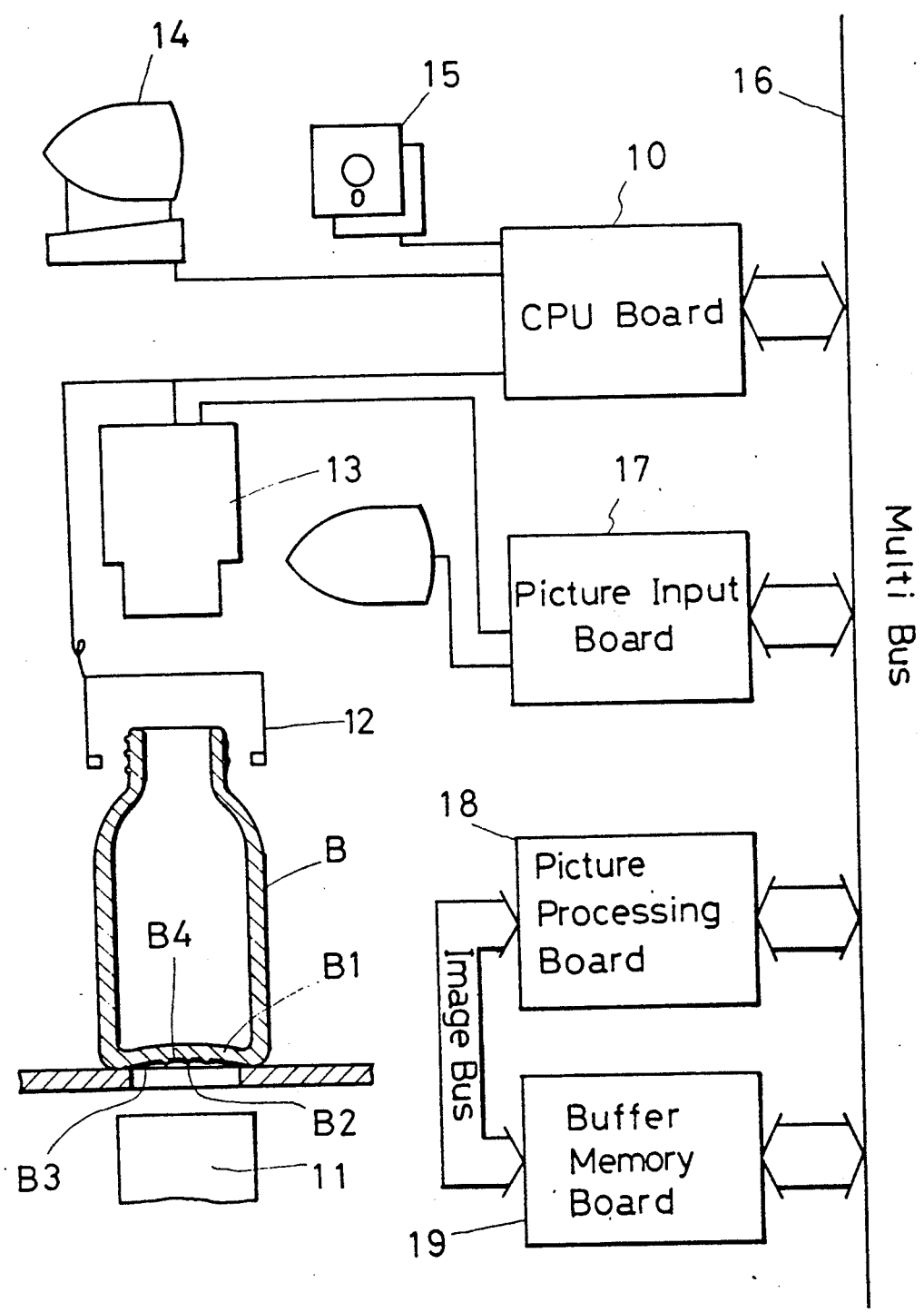
FIG. 1 is a block diagram of an apparatus for reading information on a bottom of a bottle, according to one aspect of the present invention.

An information reading apparatus according to one aspect of the present invention shown in FIG. 1 includes a CPU board 10, a light source 11, a sensor 12, a TV camera 13, an external device 14 and an external memory device 15. The CPU board 10 is electrically connected to a picture input board 17, a picture processing board 18 and a buffer memory board 19 through a multi-bus 16.

The light source 11 emits the light having a high directional property toward a bottom surface B1 of a bottle B. The directional light can be realized by a diffusion light which is transmitted through combined reflection mirrors.

The sensor 12 detects the bottle B to determine the shutter timing of the TV camera 13. The TV camera 13 has picture elements in a matrix arrangement of 256×512 in the illustrated embodiment.

The following discussion will be directed to the process of reading the information on the bottom on the bottle B with reference to FIGS. 2, 3, and 4 through 14.

Figure 2:
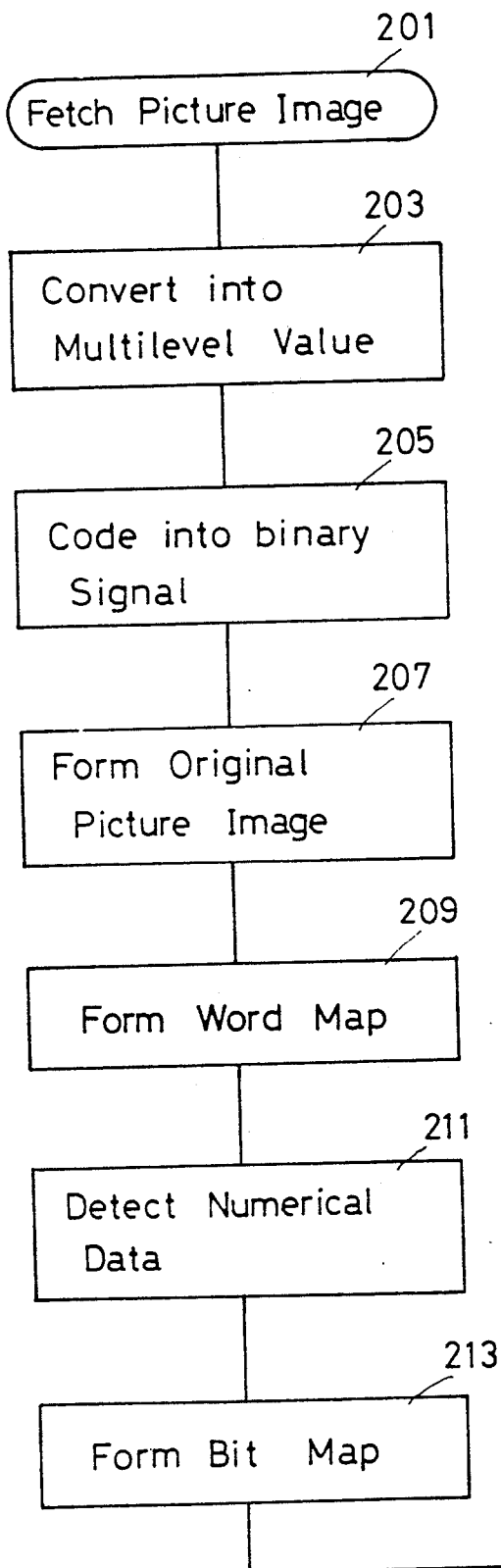
Figure 2:
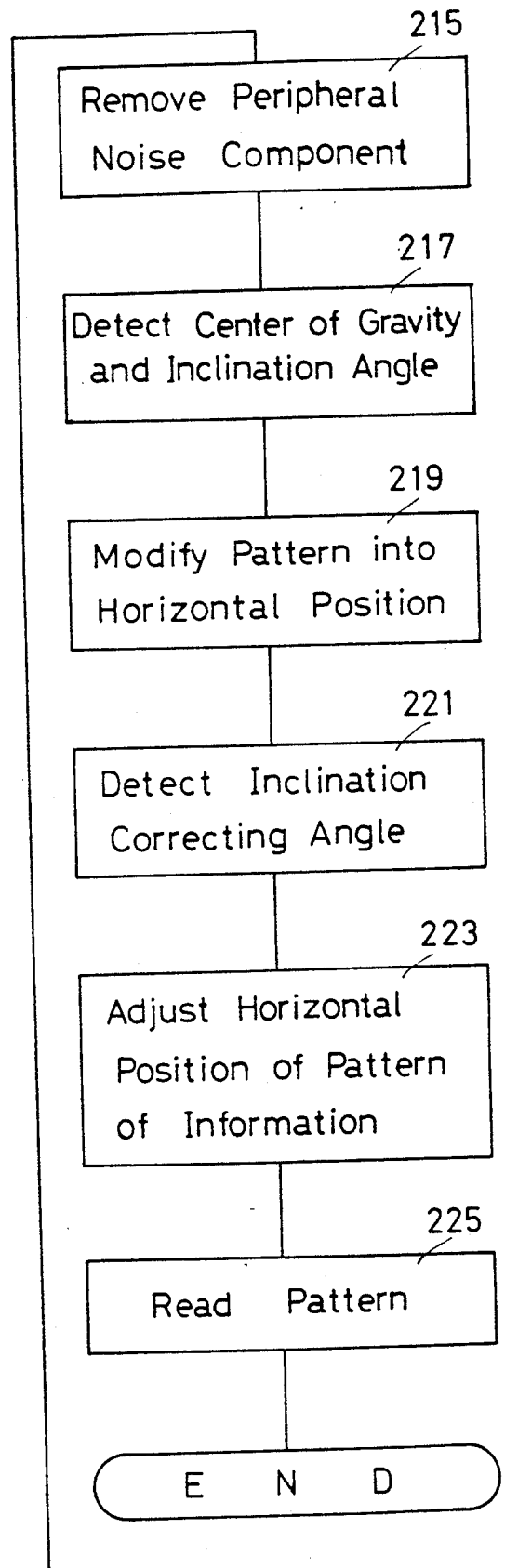
Figure 4:
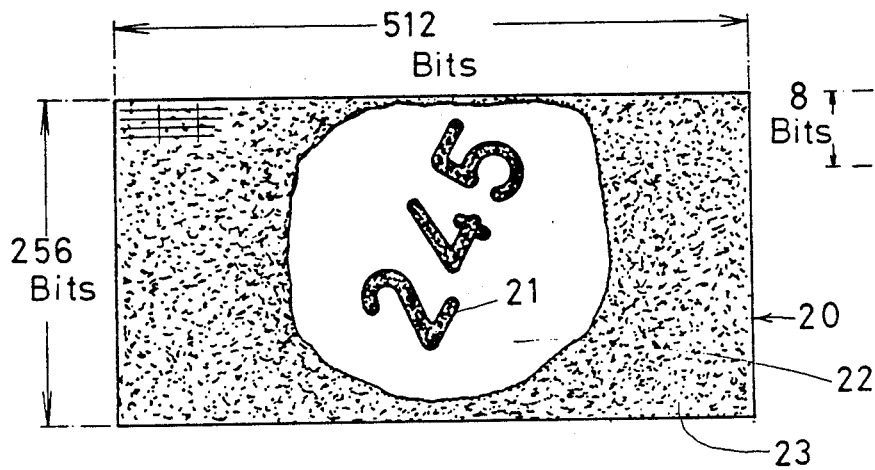
FIG. 4 shows an example of an original picture image.

First, with reference to FIG. 2 which shows a flow chart of the reading process, when a picture image of the bottom of the bottle is detected by the TV camera at step 201, the picture image signals of 256×512 which constitute the picture image are converted to multi level value signals (digital signals) at step 203. After that, the signals are coded into binary code signals in accordance with a predetermined binary level at step 205. An original picture image is formed by the binary code signals at step 207. Note that at step 270, unnecessary information, such as a noise component smaller than a pattern of the necessary information on the bottom of bottle is removed by adjusting the binary code signals. FIG. 4 shows an picture image by way of an example, in which the original picture image 20 consists of the binary code signals of 256×512, as mentioned above. In FIG. 4, the pattern (information) 21 is represented by the binary code signals "0" which are black outputs. The unnecessary information, such as fine components 23, are also represented by the binary code signals "0". A background pattern 22 is represented by the binary code signals "1" which are white outputs. In the illustrated embodiment, as mentioned above, the indication represented by the binary code signals "0" contains both the necessary information pattern 21 and the peripheral noise components 23 which are mainly formed by the peripheral portion of the bottom of the bottle. This is because the light incident upon the necessary information portion B2 and the peripheral portion B3 of the bottom B1 of the bottom B is diffused-reflected thereby to be focused as a black picture image, as can be seen in FIG. 1. The light incident upon the concaved center portion B4 of the bottom of the bottle which is transmitted therethrough forms a white image of the background. The peripheral noise components 23 are removed at step 215, as will be described hereinafter.

Figure 5:
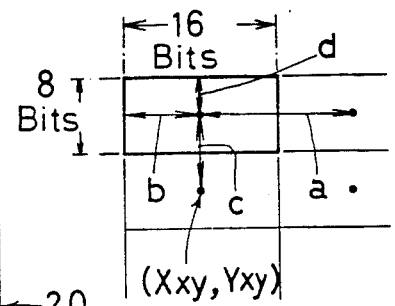
Figure 6:
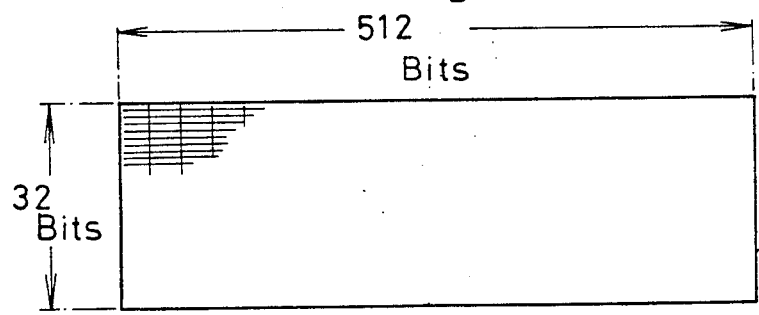
FIG. 6 shows an example of a word map.
Figure 7:
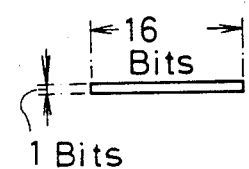

Turning to FIG. 2, at step 209, a word map is formed by the above-mentioned original picture image formed at step 207. FIG. 5 shows an example of the word map. In preparing the word map, the original picture image 20 is divided into a predetermined number of rectangular sections. In the illustrated embodiment, each rectangular section is formed by 8×16 bits, so that the original picture image is made of the rectangular sections of a 32×32 matrix. After that, at step 211, numerical data are detected by counting the number of the binary code signals "0" contained in each rectangular section. In the numerical data, a unit includes 1×16 bits (FIG. 7) which are correlated with the arrangment of the rectangular sections of the original picture image, so that the units are located in a 32×32 matrix arrangement to form a word map 25 containing 32×512 bits as shown in FIG. 6.

Figure 8:
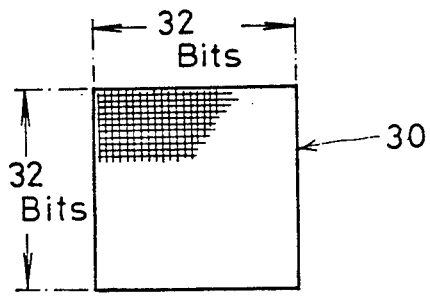
FIG. 8 shows an example of a bit map.
Figure 9:
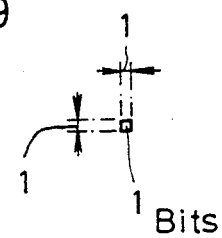

After that, at step 213, a bit map is formed based on the word map 25. FIG. 8 shows an example of the bit map. In preparing the bit map 30, the numerical data of the word map 25 are binarized in accordance with a predetermined binary numerical level to obtain binary numerical signals. In the illustrated embodiment, the rectangular sections corresponding to the pattern of necessary information 21 and the peripheral noise component 23 of the original picture image 20 are represented by "1" of the binary numerical signal, since the corresponding numerical data of the word map are above the binary level. Conversely, the rectangular sections corresponding to the pattern of background 22 on the original picture image 20 are represented by "0" of the binary numerical signal, since even if they contain "0" of the binary picture signal which are the same as that of the necessary information pattern 21, almost all of them are noise components due to the diffused reflection, so that the binary numerical signals thereof are below the binary level, as mentioned before. In the binary numerical signal, one bit forms a unit, as shown in FIG. 9, so that the binary numerical signals are correlated with the corresponding numerical data of the word map to be located in a 32×32 bit matrix arrangement, thereby to form a bit map 30. Note that the unnecessary information, such as a noise component, is removed by varying the binary numerical data level.

After that, at step 215, the peripheral noise component 23 is removed as follows.

Figure 10:
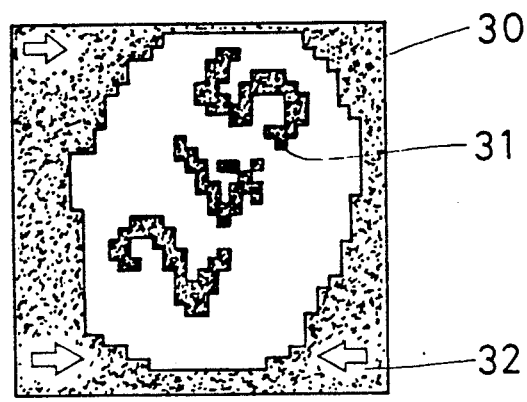

In FIG. 10 in which the binary numerical signals "1" and "0" of bit map are designated by dots and by the white background, respectively, the portions 32 corresponding to the peripheral noise component 23 are connected to each other through the circumferential signal portions. Therefore, the peripheral noise portions 32 can be detected by inverting the binary numerical signals "1" which are successively output from the right and left sides and from the upper and lower sides of the map, to "0". Thus, the peripheral noise portions 32 can be removed from the bit map.

After that, at step 217, a center of gravity G and an inclination angle $\theta g$ of the necessary information pattern on the original picture image are detected by the data of the word map, the data of the bit map from which the peripheral noise components have been removed and the coordinate data of the rectangular sections of the original picture image. The center of gravity G (Xg, Yg) can be obtained by the following equations:

$$Xg(\text{abscissa}) = \frac{\Sigma(Xxy \cdot Wxy \cdot Bxy)}{\Sigma(Wxy \cdot Bxy)}$$

$$Yg(\text{ordinate}) = \frac{\Sigma(Yxy \cdot Wxy \cdot Bxy)}{\Sigma(Wxy \cdot Bxy)}$$

wherein Wxy: numerical data of the word map; Bxy: binary numerical signal "1" or "0" of the bit map.

Xxy and Yxy which represent a coordinate of the center of a rectangular section in the original picture image are given by the following equation:

$$Xxy = axxy + b, \quad Yxy = cyxy + d$$

wherein xxy=number of row of the rectangular section; yxy=number of line of the rectangular section; a=lateral distance of the rectangular sections (a=16 in the illustrated embodiment); b=initial value of the lateral distance which is equal to half the lateral distance (b=8 in the embodiment); c=vertical distance of the rectangural sections (c=8 in the embodiment); d=initial value of the vertical distance which is equal to half the vertical distance (d=4 in the embodiment).

The inclination angle g is given for example by the following equations:

$$\tan 2\theta g = \frac{-2M11}{M20 - M02}$$

$$M20 = \Sigma\{(Xxy - Xg)^2 \cdot Wxy \cdot Bxy\}$$
$$M11 = \Sigma\{(Xxy - Xg)(Yxy - Yg) \cdot Wxy \cdot Bxy\}$$
$$M02 = \Sigma\{(Yxy - Yg)^2 \cdot Wxy \cdot Bxy\}$$

$$g = \tfrac{1}{2}\tan^{-1}\left(\frac{-2M11}{M20 - M02}\right) + n\left(\frac{\pi}{2}\right)$$

wherein the components and the constants (a, b, c and d) are same as those in the equations for the center of gravity, mentioned above.

As can be understood from the equations, in the calculation of the center of gravity and the inclination angle, the coordinate data of the rectangular sections of the original picture image represented by "0" of the binary numerical signals of the bit map and the word map data (which correspond to the area in which no necessary information portion is considered to exist) are excluded.

After that, the necessary information pattern 21 on the original picture image is rotated about the center of gravity G thus obtained by an angle corresponding to the inclination angle $\theta g$, so that the necessary information pattern is brought into a horizontal position on the picture plane, at step 219. This is a second picture image.

Figure 11:
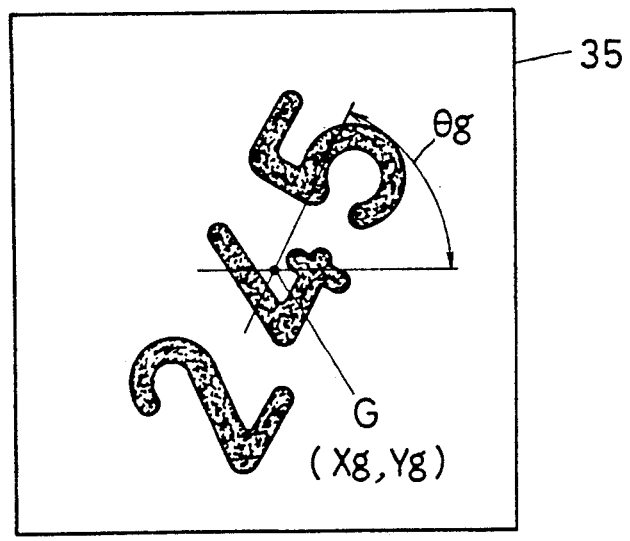

FIG. 11 shows an image prior to rotation. In the illustrated embodiment, an intermediate picture image 35 in which the necessary information pattern is extracted from the original picture image is formed, as shown in FIG. 11. Namely, taking the bit map data (binary numerical signal) into account, an access of only the areas of the original picture image in which the necessary information pattern is supposed to exist are performed to extract the necessary information pattern. Then, the intermediate picture image 35 of 256×256 bits which is half the original picture image only in the lateral size is formed, so that the center of gravity G of the necessary information pattern is a center of the picture image. By the formation of the intermediate picture image, the peripheral noise can be removed including component portion 23 or other noise portion in the orignal picture image 20, so that the area to be processed is limited to the necessary information pattern area. This also results in an increase of the speed of rotation of the image.

FIG. 12 shows the second picture image 40 which is obtained by rotating the intermediate picture image, by way of an example.

After that, at step 221, mapping of the necessary information pattern 41 which has been brought into the horizontal position in the horizontal and vertical directions are effected from the second picture image 40. An inclination correcting angle is thus obtained from the center of the figure of the necessary information pattern 41.

As shown in FIG. 12, the necessary information pattern consists of three letters, each of which is mapped. Taking the presence of a possible unclear letter into consideration, only the two letters of longer mapped pattern among the three letters are preferably to be calculated to obtain the inclination correcting angle $\theta c$ from the centers C of the figures of the two letters.

The center C of the figure can be obtained by the center of map in the horizontal and vertical directions of the letters which are subjects to be calculated.

The inclination corresting angle $\theta c$ can be obtained for example by the following equation.

$$\theta c = \tan^{-1}\left(\frac{Ycr - YcL}{Xcr - XcL}\right)$$

wherein Xcr=a center of map of one of the letters that is located right in the horizontal direction; Ycr=a center of map of one of the letters that is located right in the vertical direction; XcL=a center of map of the other letter that is located left in the horizontal direction; YcL=a center of map of the other letter that is located left in the vertical direction.

At step 221, if a map pattern of small image which has relatively short length in the horizontal and vertical directions, as shown at 45 in FIG. 12 is found, the binary picture element signal thereof is inverted to "0", since when the length of the map pattern is small, it can be judged to be a noise.

After that, at step 223, the necessary information pattern 41 of the second picture image is rotaed about the center of gravity G by the inclination correcting angle $\theta c$ to obtain a third picture image in which the horizontal position of the necessary information pattern is corrected, in the illustrated embodiment. The center of rotation about which the necessary information pattern 41 is rotated is not limited to the center of gravity G and can be the center C of a figure of the letter or the like.

FIG. 13 shows an example of the third picture image 50 in which each letter of the necessary information pattern 51 is displaced right or left in accordance with the map pattern in the horizontal direction which is obtained at step 221 to match the right and left positions for the preceding reading step 225.

Note that when the horizontal position of the necessary information is corrected in the second and third picture images, as mentioned above, there are spaces above and below the picture image. Accordingly, it is preferable to reduce the upper and lower spaces, as shown at arrows a in order to decrease the accessible data, resulting in an increased processing speed.

FIG. 14 shows a fourth picture image in which the vertical size of the third picture image is reduced. Each letter of the image is moved up and down by a same displacement in accordance with the data of the vertical map or the center of figure obtained at step 221 to match the upper and lower levels (positions) of the letters.

After that, the reading proceses is commenced as follows.

Figure 3:
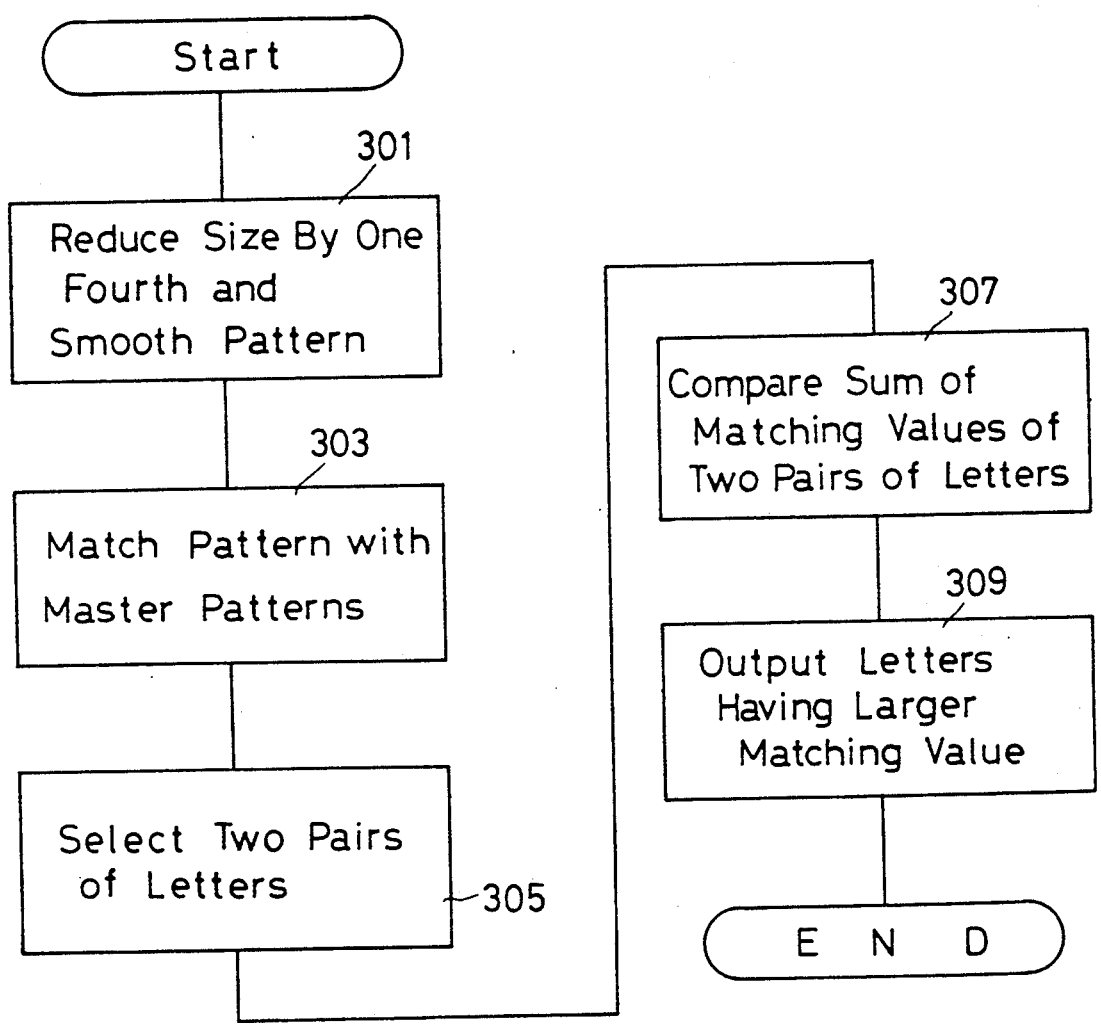

First, the fourth picture image is reduced one fourth at step 301 in FIG. 3. At this step, the noise is cut by a threshhold value and is removed by a smoothing. After that, a matching is effected for each letter by erect master patterns of 0-9 in which the posture of the pattern is corrected and inverted master patterns of 0-9 in which the posture pattern is inverted, at step 303. These master patterns are reduced by one fourth to be subject to a smoothing process, similarly to the picture image of the necessary information pattern.

Two pairs of three letters which are best matched are selected for each pair of erect master patterns and inverted master patterns, at step 305. For the two pairs of three letters thus selected for each of the erect and inverted master patterns, each letter on the picture image is compared with the matching values of the master patterns at step 307.

Finally, three letters of one of the pairs that has a larger matching value are output at step 309. It is possible to memorize a row of known three letters for checking in order to make the output more precisely. The result read out can be displayed or indicated by the external terminal device.

As can be understood from the above discussion, according to the present invention, the information on a product which is unfixed in direction, such as a bottle, can be easily and simply detected. In addition, even numeral, Roman letters, or marks can be certainly read.

Furthermore, according to the present invention, when information to be read is located in a horizontal position, insignificant data are removed by the use of the word map and the bit map which are prepared from the original picture image. Further, the necessary information is selected to an extent that there is no inconvenience and accordingly the amount of data to be processed can be extremely decreased, thus resulting in a high speed reading. This also contributes to a precise detection of products on a conveyor line.

What is claimed is:

1. An apparatus for reading information, comprising:
   an original picture forming means for converting a picture element signal of an object produced by a television camera to a digital signal, to code said digital signal into binary picture element signals to form a pattern representing an original picture image from said binary picture element signals;
   a word map forming means for dividing said original picture image produced by said original picture forming means into a plurality of rectangular sections, for counting binary picture element signals that define a pattern contained in said original picture image as distinguished from a background pattern for each of said plurality of rectangular sections, for obtaining numerical data, and for forming a word map in which said numerical data are constituent units of said word map and are correlated with corresponding ones of said plurality of rectangular sections;
   a bit map forming means for coding said numerical data of said word map into binary numerical data which are correlated with corresponding numerical data to form a bit map in which said binary numerical data are constituent units;
   a first calculating means for distinguishing said pattern contained in said original picture image from said background from numerical data corresponding to parts of said binary numerical data of said word map that have a level higher than a predetermined binary numerical level, for determining coordinates of said rectangular sections of said original picture image corresponding to said numerical data having said level higher than said predetermined binary level, and for determining a center of gravity and an estimated inclination angle of said pattern contained in said original picture image from said numerical data;
   a second picture image forming means for rotating said pattern contained in said original picture image by an angle corresponding to said estimated inclination angle about said center of gravity to form a second picture image in which said pattern contained in said original picture image is arranged in a horizontal position;
   a second calculating means for mapping said second picture image in a horizontal direction and in a vertical direction to determine an inclination correcting angle required to substantially completely horizontally orient said pattern contained in said second picture image;
   a third picture image forming means for rotating said pattern contained in said second picture image by an angle corresponding to said inclination correcting angle to form a third picture image which has a corrected orientation of said pattern contained in said original picture image; and
   a reading means for matching said pattern contained in said corrected orientation in said third picture image with an erect master pattern and with an inverted master pattern.

* * * * *